United States Patent [19]
Emambakhsh et al.

[11] Patent Number: 5,503,425
[45] Date of Patent: Apr. 2, 1996

[54] AIR BAG MODULE WITH EXPANDABLE RETAINING RING

[75] Inventors: Al S. Emambakhsh, Flat Rock; Jeffrey R. Flattery, Rochester Hills; Scott A. Kelley, Algonac, all of Mich.

[73] Assignee: TRW Vehicle Safety Systems Inc., Lyndhurst, Ohio

[21] Appl. No.: 331,223

[22] Filed: Oct. 28, 1994

[51] Int. Cl.⁶ .................................................. B60R 21/16
[52] U.S. Cl. ............................................. 280/728.2; 248/99
[58] Field of Search ........................... 280/743 R, 728 A, 280/728 R, 743.1, 728.2, 728.1; 248/99, 101

[56] References Cited

U.S. PATENT DOCUMENTS

| | | | |
|---|---|---|---|
| 1,012,045 | 12/1911 | Adams | 248/99 |
| 1,618,433 | 2/1927 | Hubbard | 248/101 |
| 5,074,584 | 12/1991 | Jarboe | 280/728 A |
| 5,074,585 | 12/1991 | Satoh . | |
| 5,096,222 | 3/1992 | Komerska et al. | 280/728 A |
| 5,135,252 | 8/1992 | Suran et al. . | |
| 5,234,227 | 8/1993 | Webber . | |
| 5,255,937 | 10/1993 | Emambakhsh et al. | 280/728 A |
| 5,263,739 | 11/1993 | Webber et al. . | |

*Primary Examiner*—Karin L. Tyson
*Attorney, Agent, or Firm*—Tarolli, Sundheim, Covell Tummino & Szabo

[57] ABSTRACT

An air bag module (10) includes a housing (12). An air bag (22) is folded and stored in the housing (12). A retaining ring (30) secures the air bag (22) to the housing (12). The retaining ring (30) includes two relatively movable U-shaped members (152, 154). Assembly tabs (210, 212, 252, 254) on the retaining ring members (152, 154) are gripped to move the retaining ring (30), in a collapsed condition, in one direction (32) through a deployment opening (150) into the housing (12). The retaining ring (30) is then expanded and moved in an opposite direction (34) to interlock with the housing (12).

17 Claims, 4 Drawing Sheets

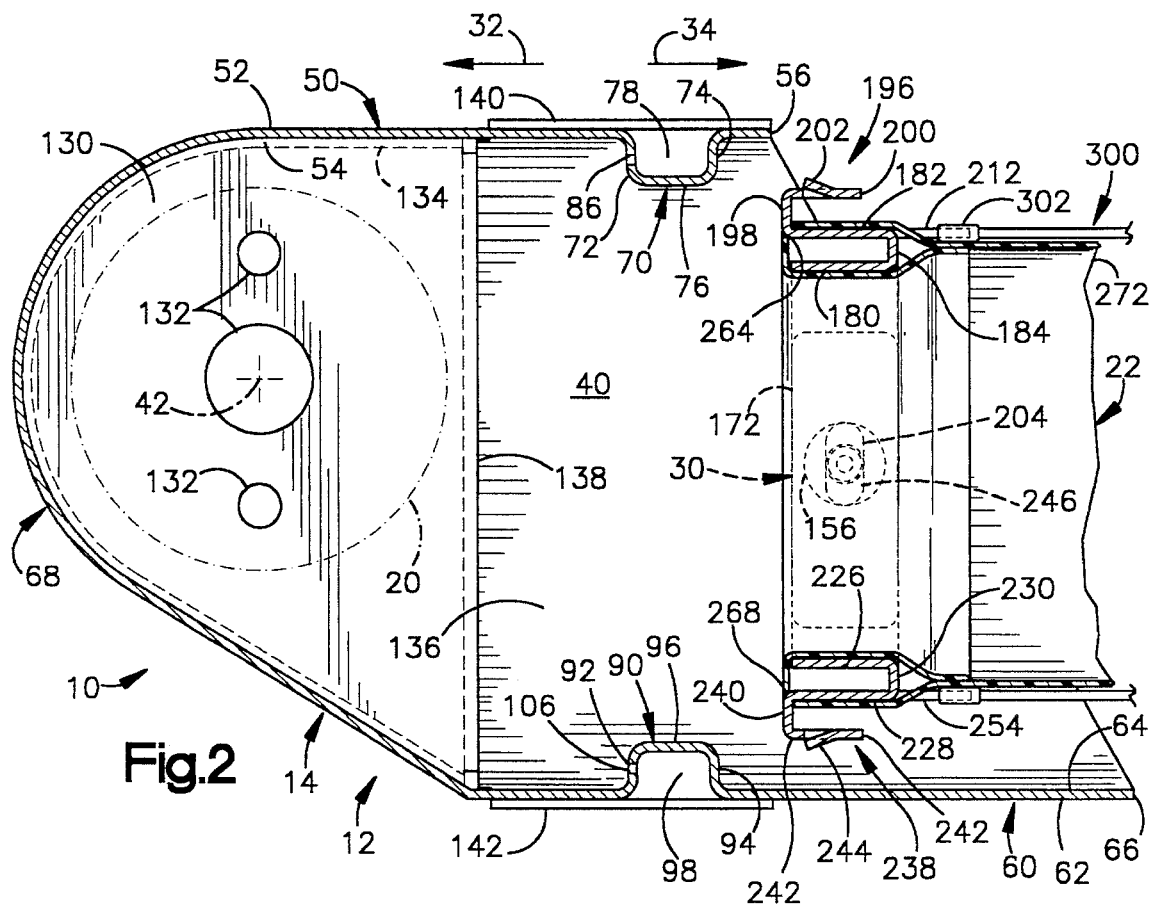

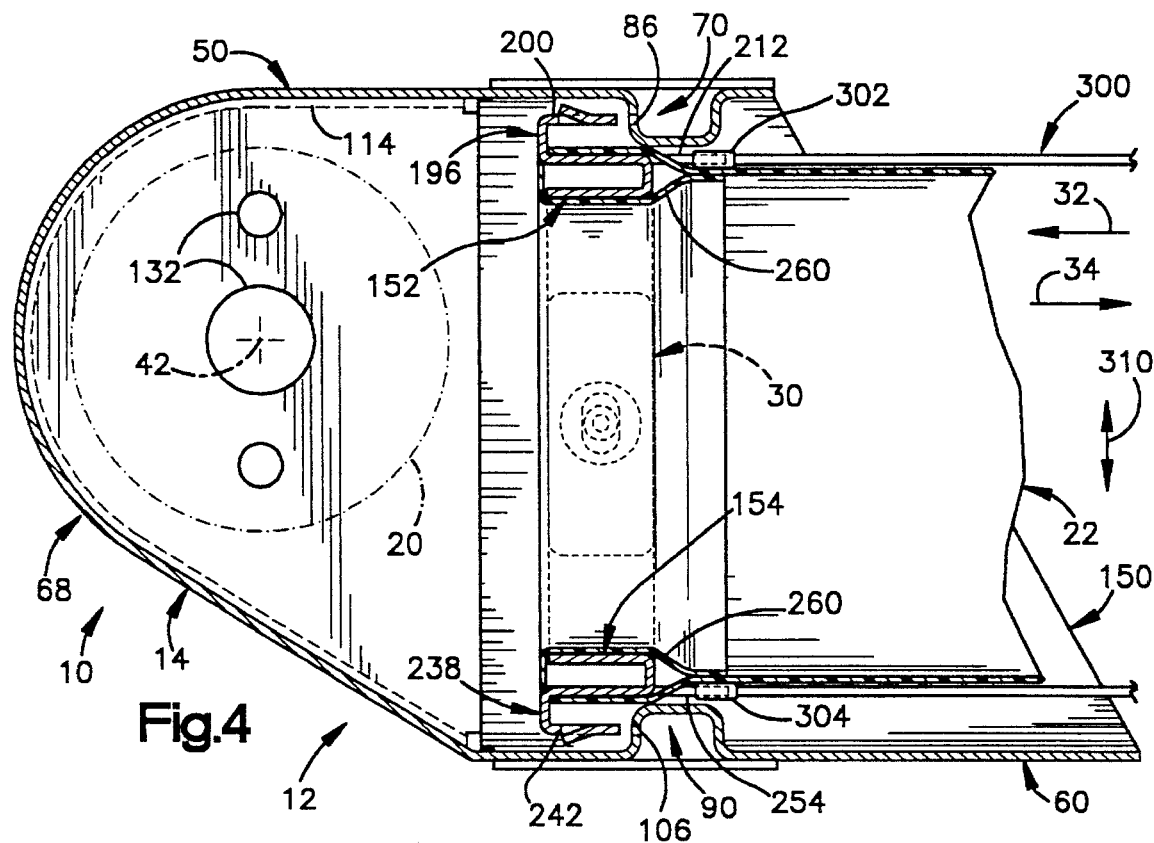
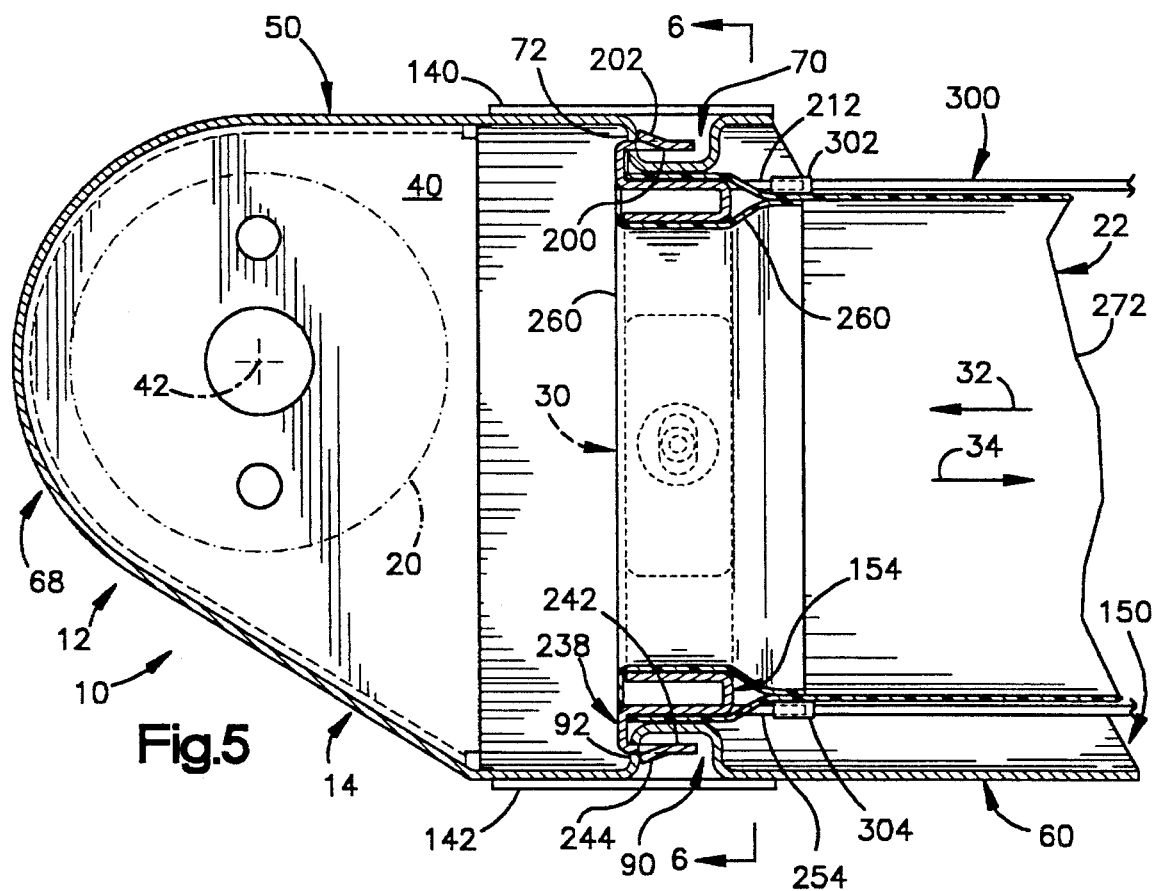

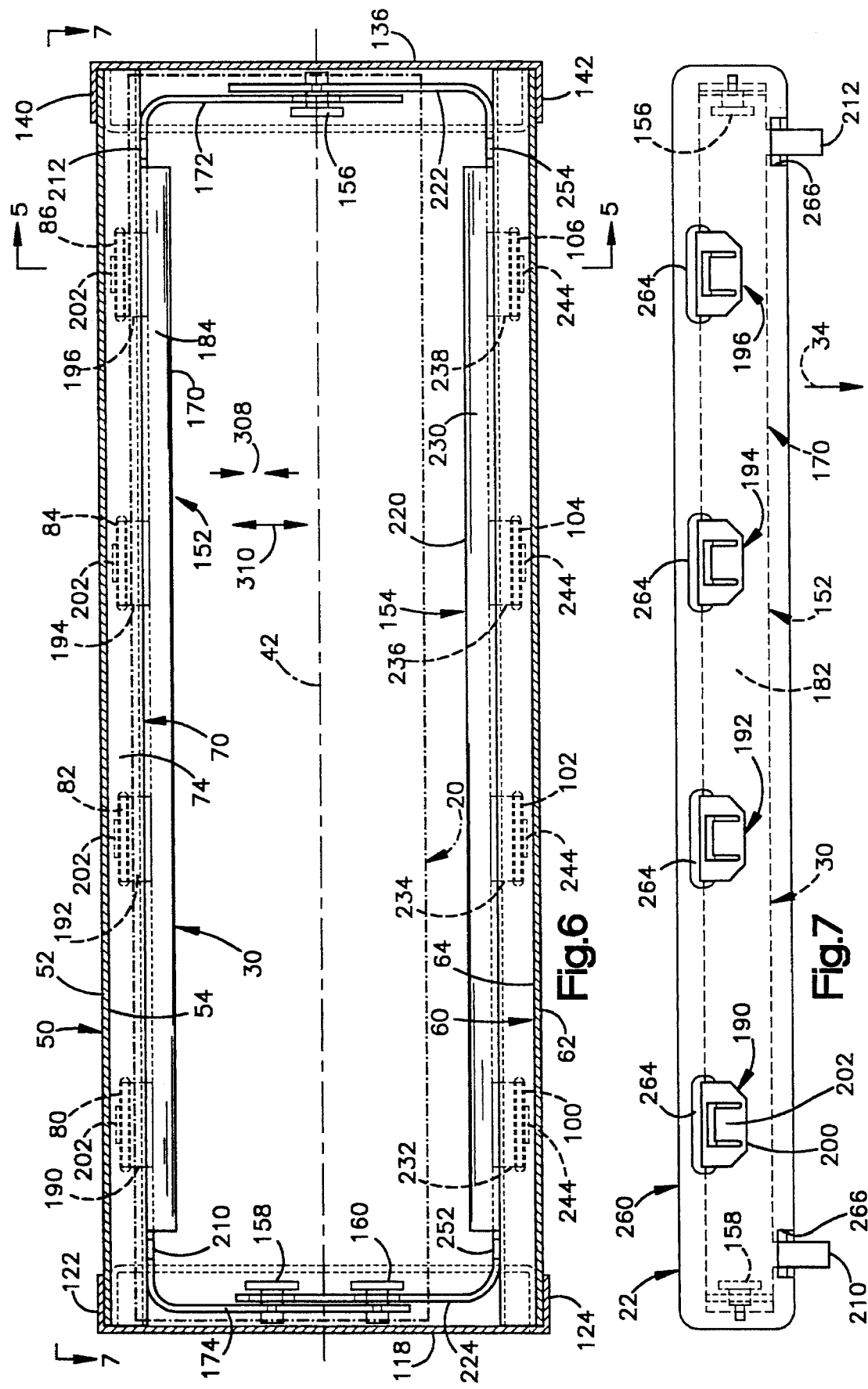

AIR BAG MODULE WITH EXPANDABLE RETAINING RING

BACKGROUND OF THE INVENTION

1. Technical Field

The present invention relates to a vehicle occupant safety apparatus, and particularly relates to an air bag module including a housing and a retaining ring for securing an air bag to the housing.

2. Description of the Prior Art

A typical air bag module includes an air bag, an inflator for inflating the air bag, and a housing in which the air bag and the inflator are disposed. The air bag is connected to a retaining ring. The retaining ring is then secured to the housing with rivets or screws to retain the air bag in the housing. In the event of a vehicle collision, the inflator is actuated to direct inflation fluid into the air bag. The air bag inflates into a position to restrain the vehicle occupant from forcefully striking parts of the vehicle.

SUMMARY OF THE INVENTION

The present invention is an apparatus comprising an inflatable vehicle occupant restraint and a housing in which the inflatable restraint is mounted. The housing has a deployment opening through which the restraint is inflatable to restrain a vehicle occupant. A retaining ring secures the inflatable restraint in the housing. The retaining ring comprises at least two members which are connected with each other and which are movable relative to each other. Each of the two members has grippable projecting assembly tabs.

A pouch portion of the inflatable restraint which encircles the retaining ring has openings through which the assembly tabs extend. The pouch portion defines an inflation fluid opening of the inflatable restraint through which inflation fluid is directed into the restraint. The retaining ring has a collapsed condition in which the two members are located in a first position relative to each other to define an inflation fluid opening of a relatively small area, for insertion of the retaining ring and the pouch portion in a first direction through the deployment opening into the housing. The retaining ring has an expanded condition in which the two members are located in a second position relative to each other to define an inflation fluid opening of a relatively large area. The two members are moved from the first position to the second position by gripping and moving the grippable projecting assembly tabs.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a sectional view of the vehicle safety apparatus of FIG. 1 including a retaining ring shown in a collapsed condition prior to insertion into a housing;

FIG. 3 is a view similar to FIG. 2 showing the retaining ring in a collapsed condition after insertion into the housing;

FIG. 4 is a view similar to FIG. 2 and showing the retaining ring in an expanded condition after insertion into the housing;

FIG. 5 is a view similar to FIG. 2 and showing the retaining ring in an expanded condition after interlocking with the housing;

FIG. 6 is a sectional view taken along line 6—6 of FIG. 5 with parts removed; and FIG. 7 is a view taken generally along line 7—7 of FIG. 6 of the retaining ring and an air bag.

DESCRIPTION OF A PREFERRED EMBODIMENT

Figure 1:
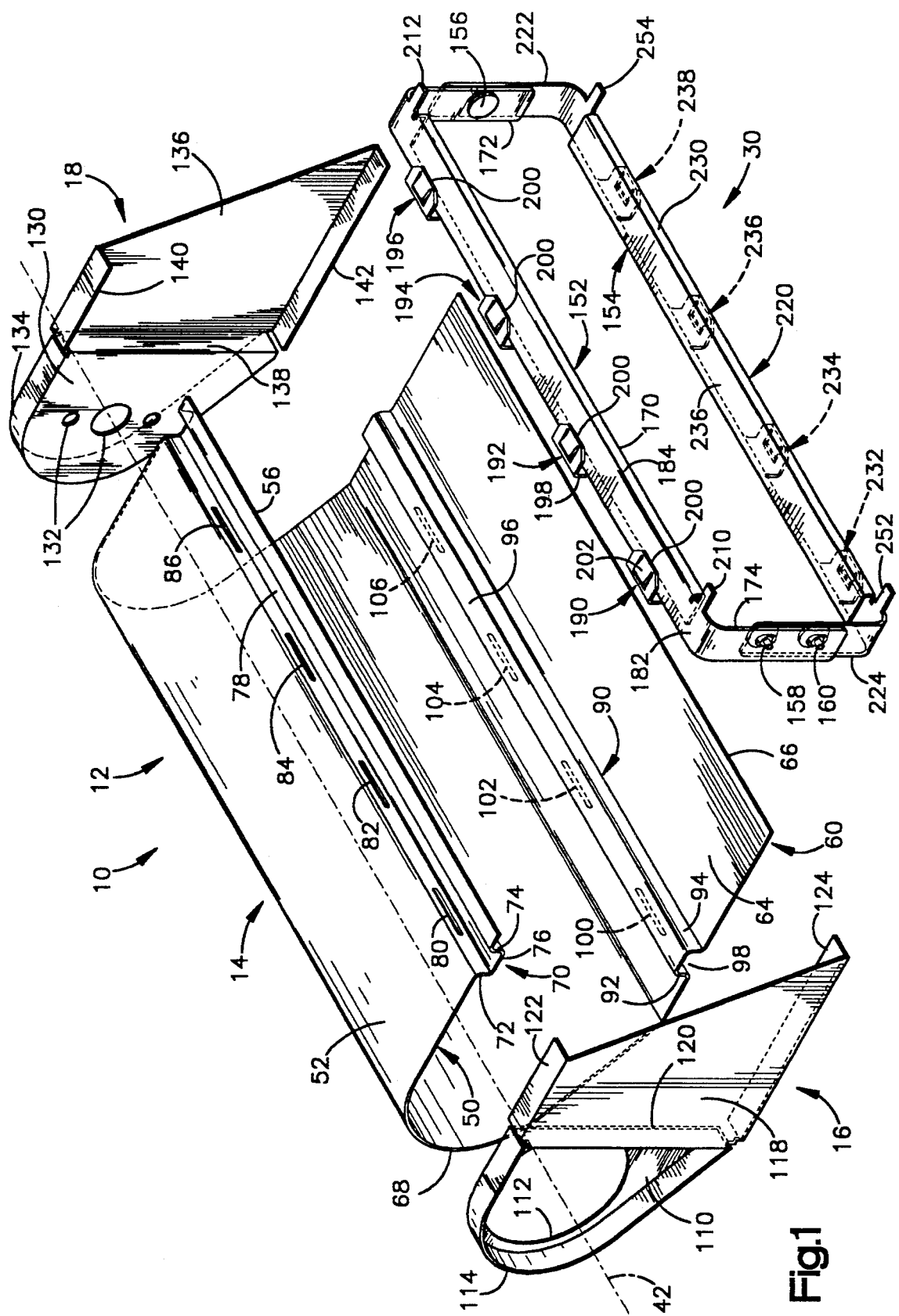
FIG. 1 is an exploded perspective view with parts removed of a vehicle safety apparatus embodying the present invention.

The present invention relates to a vehicle safety apparatus and particularly relates to a vehicle safety apparatus including an inflatable vehicle occupant restraint which is inflated to protect an occupant of a vehicle in the event of a vehicle collision. The present invention is applicable to various vehicle safety apparatus constructions. As representative of the present invention, FIG. 1 illustrates a vehicle safety apparatus comprising an air bag module 10.

The module 10 includes a housing 12 having a central portion 14 and two end portions 16 and 18. The module 10 also includes an inflator (i.e., a source of inflation fluid) indicated schematically at 20 (FIG. 2), an air bag 22, and an air bag retaining ring 30. The module 10 is mounted in an instrument panel of a vehicle (not shown) so that the left portion (as viewed in FIG. 2) of the module 10 is disposed in the vehicle at a location forward of the right portion (as viewed in FIG. 2) of the module. The air bag 22, when inflated, deploys in a rearward direction 34 (i.e., to the right as viewed in FIG. 2) to restrain a vehicle occupant. The forward direction in the vehicle is indicated by the arrow 32.

The three portions 14, 16 and 18 of the housing 12 define a chamber 40 in the housing. An axis 42 of the module 10 extends longitudinally between the end portions 16 and 18 of the housing 12. The housing 12 includes mounting flanges or other structure (not shown) for securing the housing to the vehicle, in any known manner.

The central portion 14 (FIG. 1) of the housing 12 is made of sheet metal and includes a generally planar upper wall 50 which extends parallel to the axis 42. The upper wall 50 has an outer side surface 52, an inner side surface 54, and a rear edge 56. A generally planar lower wall 60 is spaced from and extends parallel to the upper wall 50 and to the axis 42. The lower wall 60 has an outer side surface 62, an inner side surface 64 and a rear edge 66. The inner side surface 64 of the lower wall 60 faces the inner side surface 54 of the upper wall 50. The central portion 14 of the housing 12 further includes a curved central wall 68 extending between and interconnecting the upper wall 50 and the lower wall 60 to form a C-shaped cross-sectional configuration as shown in FIG. 2.

An upper locking rib 70 is formed in the upper wall 50 of the central portion 14 of the housing 12. The upper locking rib 70 is disposed adjacent to but spaced forward from the rear edge 56 of the upper wall 50. Parallel front and rear walls 72 and 74 of the upper locking rib 70 extend perpendicular to the upper wall 50 of the central portion 14 of the housing 12 toward the lower wall 60. An inner wall 76 extends parallel to the upper wall 50 and interconnects the front and rear walls 72 and 74.

The walls 72, 74 and 76 give the upper locking rib 70 a U-shaped configuration and define an open channel 78 on the outer side surface 52 of the upper wall 50. A series of elongate slots 80, 82, 84 and 86 extend in a front to rear direction through the front wall 72 of the upper locking rib 70 and into the channel 78. The slots 80–86 are spaced evenly along the length of the upper locking rib 70.

A lower locking rib 90 is formed in the lower wall 60 of the central portion 14 of the housing 12. The lower locking rib 90 is a mirror image of the upper locking rib 70. The lower locking rib 90 is disposed at a location adjacent to but spaced forward from the rear edge 66 of the lower wall 60. Parallel front and rear walls 92 and 94 of the lower locking rib 90 extend perpendicular to the lower wall 60 toward the upper wall 50. An inner wall 96 extends parallel to the lower wall 60 and interconnects the front and rear walls 92 and 94.

The walls 92, 94 and 96 give the lower locking rib 90 a U-shaped configuration and define an open channel 98 on the outer side surface 62 of the lower wall 60. A series of slots 100, 102, 104 and 106 extend in a front to rear direction through the front wall 92 of the lower locking rib 90 and into the channel 98. The slots 100–106 are spaced evenly along the length of the lower locking rib 90.

The end portions 16 and 18 of the housing 12 extend perpendicular to the upper and lower walls 50 and 60 of the housing and at opposite ends of the C-shaped configuration. The first end portion 16 of the housing 12 includes a planar front wall portion 110 (FIG. 1) which extends perpendicular to the axis 42. A circular opening 112 is formed in the wall portion 110 for receiving the inflator 20. An outer peripheral flange 114 extends axially outward from the front wall portion 110. The flange 114 is disposed radially inward of and is closely fitted within the C-shaped configuration of the central portion 14 of the housing 12. The flange 114 is welded to the central portion 14 of the housing 12 in a manner not shown.

The first end portion 16 of the housing 12 also includes a planar rear wall portion 118 which extends perpendicular to the axis 42 and parallel to, but axially offset from, the front wall portion 110. An axially extending wall portion 120 interconnects the rear wall portion 118 with the front wall portion 110. Upper and lower rear flanges 122 and 124 extend axially inward from the rear wall portion 118. The flanges 122 and 124 overlie the outer side surfaces 54 and 62 of the upper and lower walls 50 and 60 of the central portion 14 of the housing 12. The flanges 122 and 124 are welded to the central portion 14 of the housing 12 in a manner not shown.

The second end portion 18 of the housing 12 is substantially a mirror image of the first end portion 16. The second end portion 18 of the housing 12 includes a planar front wall portion 130 which extends perpendicular to the axis 42. A plurality of circular openings 132 are formed in the front wall portion 130 for receiving portions of the inflator 20 such as lead wires and orientation studs.

An outer peripheral front flange 134 extends axially outward from the front wall portion 130. The flange 134 is disposed radially inward of and is closely fitted within the C-shaped configuration of the central portion 14 of the housing 12. The flange 134 is welded to the central portion 14 of the housing 12 in a manner not shown.

The second end portion 18 of the housing 12 includes a planar rear wall portion 136 which extends perpendicular to the axis 42 and parallel to, but axially offset from, the front wall portion 130. The rear wall portion 136 is interconnected with the front wall portion 130 by an axially extending wall portion 138. Upper and lower rear flanges 140 and 142 extend axially inward from the rear wall portion 136. The upper flange 140 overlies the outer main side surface 54 of the upper wall 50 of the central portion 14 of the housing 12. The lower flange 142 overlies the outer major side surface 62 of the lower wall 60 of the central portion 14 of the housing 12. The flanges 140 and 142 are welded to the central portion 14 of the housing 12 in a manner not shown.

The rear edge 56 of the upper wall 50 and the rear edge 66 of the lower wall 60, together with the rear edges of the end portions 16 and 18 of the housing, define a deployment opening 150 (FIG. 3) of the housing. The housing 12 includes a cover (not shown) for the deployment opening 150. The cover, which is preferably made of plastic, conceals the air bag 22 and closes the deployment opening 150. The cover is preferably configured as and forms a portion of an instrument panel of the vehicle, which portion is visible to a vehicle occupant.

The retaining ring 30 (FIGS. 1, 2, 6 and 7) is made from sheet metal and is generally rectangular in overall configuration as viewed from the front or rear of the module 10. The retaining ring 30 is made up of two substantially identical U-shaped members 152 and 154 which are connected with each other by three rivets 156, 158 and 160. Each one of the retaining ring members 150 and 152 is made of one piece of sheet metal stamped and formed to the illustrated configuration.

The U-shaped configuration of the upper retaining ring member 152 includes a base portion 170 and two parallel leg portions 172 and 174. The base portion 170 extends parallel to the upper wall 50 of the central portion 14 of the housing 12 when the retaining ring 30 is assembled in the housing. The leg portions 172 and 174 extend from opposite ends of the base portion 170 in a direction perpendicular to the base portion. The leg portions 172 and 174 extend parallel to the end portions 16 and 18 of the housing 12 when the retaining ring 30 is assembled in the housing.

The base portion 170 of the upper retaining ring member 152 includes three axially extending walls 180, 182 and 184 which define a generally rectangular cross-sectional configuration as best seen in FIG. 2. Inner and outer walls 180 and 182 of the base portion 170 extend parallel to the plane of the upper wall 50 of the central portion 14 of the housing 12. A rear wall 184 of the base portion 170 interconnects the inner and outer walls 180 and 182 and extends perpendicular to the inner and outer walls.

The upper retaining ring member 152 includes a series of fasteners 190, 192, 194 and 196 which project from the outer wall 182 of the base portion 170. In the illustrated embodiment, the fasteners 190–196 are formed as hooks which project outward and rearward from the outer wall 182. The hooks 190–196 are spaced apart evenly along the length of the base portion 170 of the upper retaining ring member 152. The spacing between the hooks 190–196 is the same as the spacing between the slots 80–86 in the upper locking rib 70.

Each hook 190–196 includes a first leg 198 which projects outward in a direction perpendicular to the outer wall 182. In each hook 190–196, a second leg 200 projects rearward from the first leg 198 in a direction parallel to the outer wall 182 of the base portion 170. On each second leg 200, a portion of the material of each second leg 200 is bent outward to form a dart 202 which is resiliently connected to the second leg. The darts 202 project forward and outward from the plane of the second leg 200 of the hooks 190–196. The darts 202 can be deflected inward into the plane of the second legs 200 of the hooks 190–196 and spring back when released.

The leg portions 172 and 174 of the upper retaining ring member 152 are generally planar in configuration. A single rivet opening 204 in the form of an elongate slot is formed in the leg portion 172. A pair of rivet openings in the form of elongate slots are formed in the other leg portion 174 of the upper retaining ring member 152.

A pair of grippable assembly tabs 210 and 212 are disposed at opposite axial ends of the base portion 170 of the upper retaining ring member 152. The assembly tabs 210 and 212 are formed as one piece with the upper retaining ring member 152. The assembly tabs 210 and 212 are disposed in the plane of the outer wall 182 of the base portion 170. The assembly tabs 210 and 212 project rearward from the outer wall 182 in a direction toward the deployment opening 150 when the retaining ring 30 is assembled in the housing 12. This positioning of the assembly tabs 210 and 212 enables gripping and movement of the assembly tabs through the deployment opening 150. The distance by which the assembly tabs 210 and 212 project from the outer wall 182 is about the same as the front to rear dimension of the outer wall 182 of the upper retaining ring member 152. The assembly tabs 210 and 212 are large enough to be gripped to move the upper retaining member 152, but small enough not to add significant weight or space requirements to the retaining ring 30.

The lower retaining ring member 154 (FIGS. 1 and 2) includes a base portion 220 which extends parallel to the lower wall 60 of the central portion 14 of the housing 12. Two leg portions 222 and 224 extend from opposite ends of the base portion 220 in a direction parallel to the end portions 16 and 18 of the housing 12. The base portion 220 includes three axially extending walls 226, 228 and 230 which define a generally rectangular cross-sectional configuration as best seen in FIG. 2. The inner and outer walls 226 and 228 of the base portion 220 extend parallel to the plane of the lower wall 60 of the central portion 14 of the housing 12. The rear wall 230 of the base portion 220 interconnects the inner and outer walls 226 and 228 and extends perpendicular to the inner and outer walls.

The lower retaining ring member 154 includes a series of fasteners 232, 234, 236 and 238 which project from the outer wall 228 of the base portion 220. In the illustrated embodiment, the fasteners 232–238 are formed as hooks which project outward and rearward from the outer wall 228. The hooks 232–238 are spaced apart evenly along the length of the base portion 220 of the lower retaining ring member 154. The spacing between the hooks 232–238 is the same as the spacing between the slots 100–106 in the lower locking rib 90 of the central portion 14 of the housing 12.

Each hook 232–238 includes a first leg 240 which extends perpendicular to the outer wall 228 and a second leg 242 which projects rearward from the outer end of the first leg 240. On each hook 232–238, a portion of each second leg 242 is formed as a dart 244 which is resiliently connected with the second leg 242. The darts 244 are bent outward from and project forward from the second legs 242 of the hooks 232–238. The darts 244 can be deflected down into the plane of the second legs 242 and spring back when released.

The leg portions 222 and 224 of the lower retaining ring member 154 are generally planar in configuration. A single rivet opening in the form of an elongate slot 246 is formed in the one leg portion 222. In the other leg portion 224 are two spaced rivet openings in the form of elongate slots.

A pair of grippable assembly tabs 252 and 254 are disposed at opposite ends of the base portion 220 of the lower retaining ring member 154. The assembly tabs 252 and 254 are formed as one piece with the lower retaining ring member 154. The assembly tabs 252 and 254 are similar in configuration and positioning to the assembly tabs 210 and 212 on the upper retaining ring member 152. The assembly tabs 252 and 254 are disposed in the plane of the outer wall portion 228 of the base portion 220. The assembly tabs 252 and 254 project rearward from the outer wall 228 in a direction toward the deployment opening 150 when the retaining ring 30 is assembled in the housing 12. The distance by which the assembly tabs 252 and 254 project from the outer wall 228 is about the same as the front to back dimension of the outer wall 228 of the base portion 220 of the lower retaining ring member 154.

The three rivets 156, 158 and 160 (FIGS. 1 and 6) slidably interconnect the upper retaining ring member 152 with the lower retaining ring member 154. One rivet 156 is disposed at one end of the retaining ring 30 in the slots 204 and 246 in the leg portions 172 and 222 of the retaining ring members 152 and 154, respectively. The other rivets 158 and 160 are disposed at the opposite end of the retaining ring 30 in the slots in the leg portions 174 and 224 of the retaining ring members 152 and 154, respectively. The rivets 156, 158 and 160 are relatively loosely fitted in the retaining ring 30 to enable relative sliding movement of the retaining ring members 152 and 154 in a direction so as to move the base portions 170 and 220 closer together or farther apart. The provision of the two rivets 158 and 160 at one end of the retaining ring 30 blocks relative rotation of the upper and lower retaining ring members 152 and 154.

The air bag 22, only portions of which are illustrated in the drawings, is folded and stored in a known manner in the chamber 40 in the housing 12. The air bag 22 is made from a fabric material, preferably woven nylon. A pouch portion 260 of the air bag 22 has a tubular cross-sectional configuration so that it can be closely fitted around the upper and lower retaining ring members 152 and 154. Four hook openings 264 and two assembly tab openings 266 (FIG. 7) are formed on an upper part of the pouch portion 260. Four hook openings 268 and two assembly tab openings (not shown) are formed in a lower part of the pouch portion 260.

The pouch portion 260 of the air bag 22, together with the retaining ring 30, defines an inflation fluid opening 270 (FIG. 3) of the air bag. A main body portion 272 of the air bag 22, made of one or more panels of fabric material, is folded and stored in the chamber 40 when the air bag is in an uninflated condition. The main body portion 272 of the air bag 22 defines an inflation fluid volume into which inflation fluid is directed from the inflator 20 to inflate the air bag 22. When the air bag 22 is in an inflated condition, the main body portion 272 extends rearward from the pouch portion 260 in a direction through the deployment opening 150.

The inflator 20 (FIGS. 2–6) is disposed in the chamber 40 in the housing 12 adjacent to the central wall 68 of the central portion 14 of the housing. The inflator 20 is a known inflator having an elongate cylindrical shape with a longitudinal axis which is coincident with the axis 42. The inflator 20 has one or more fluid outlets (not shown) through which inflation fluid is directed, upon actuation of the inflator, into the chamber 40 to inflate the air bag 22.

In assembling the air bag module 10, the air bag 22 is first secured to the retaining ring 30. The pouch portion 260 of the air bag 22 is wrapped around the retaining ring 30 and sewn at a stitching line (not shown). The hooks 190–196 on the upper retaining ring member 152 extend out of the pouch portion 260 of the air bag 22 through the hook openings 264 in the pouch portion of the air bag. The assembly tabs 210 and 212 on the upper retaining ring member 152 extend out of the pouch portion 260 of the air bag 22 through the assembly tab openings 266 in the pouch portion of the air bag. The assembly tabs 210 and 212 are thus grippable to move the upper retaining ring member 152.

The hooks 232–238 on the lower retaining ring member 154 extend out of the pouch portion 260 of the air bag 22 through the hook openings 268 in the pouch portion of the air bag. The assembly tabs 252 and 254 on the lower retaining ring member 154 extend out of the pouch portion 260 of the air bag 22 through the assembly tab openings (not shown) in the pouch portion of the air bag. The assembly tabs 252 and 254 are thus grippable to move the lower retaining ring member 154.

The air bag 22 is next folded in a known manner to form a package with the retaining ring 30 (for clarity, the air bag is shown in the drawings in an unfolded condition). The retaining ring 30 may be in either an expanded condition or a collapsed condition. With the air bag 22 in the folded condition, the assembly tabs 210, 212, 252 and 254 are disposed outside of the inflation fluid volume defined by the main body portion 272 of the air bag. The assembly tabs 210, 212, 252 and 254 are thus engageable or grippable to move the assembled retaining ring 30 and air bag 22.

The assembly of the retaining ring 30 and the air bag 22 is then positioned outside the chamber 40 in the housing 12, adjacent to the deployment opening 150, as shown in FIG. 2. The retaining ring 30 is moved into a collapsed condition prior to moving the retaining ring into the housing 12. To move the retaining ring 30 into the collapsed condition, the assembly tabs 210, 212, 252 and 254 are gripped with a suitable assembly fixture indicated schematically at 300 (FIG. 2). The assembly fixture 300 includes upper gripper members 302 (FIG. 2) for gripping the assembly tabs 210 and 212 on the upper retaining ring member 152. The assembly fixture 300 includes lower gripper members 304 (FIG. 2) for gripping the assembly tabs 252 and 254 on the lower retaining ring member 154. The gripper members 302 and 304 can be tubular members or any other suitable structure or device for capturing or gripping the assembly tabs 210, 212, 252 and 254.

The retaining ring 30 is moved into the collapsed condition by simultaneously (a) gripping the assembly tabs 210 and 252 and moving them toward each other and (b) gripping the assembly tabs 212 and 254 and moving them toward each other. As the assembly tabs 210, 212, 252 and 254 move toward each other, the upper and lower retaining ring members 152 and 154 move toward each other in a direction as indicated by the arrows 308 (FIG. 3). The rivets 156, 158 and 160 limit the relative sliding movement of the upper retaining ring member 152 and the lower retaining member 154 toward each other. When the retaining ring 30 is in the collapsed condition, the upper retaining ring member 152 is relatively close to the lower retaining ring member 154. The retaining ring 30 and the pouch portion 260 of the air bag 22 define an inflation fluid opening of a relatively small size (i.e., area).

After the retaining ring 30 is placed in the collapsed condition, the gripper members 302 and 304 are moved through the deployment opening 150 in the forward direction 32, that is, to the left as viewed in FIGS. 2 and 3. As the gripper members 302 and 304 move in the forward direction 32, the assembly tabs 210, 212, 252 and 254, which are gripped by the assembly fixture 300, also move in the forward direction. The forward movement of the assembly tabs 210, 212, 252 and 254 results in forward movement of the other portions of the retaining ring 30, and of the air bag 22, through the deployment opening 150 and into the chamber 40 in the housing 12. The assembled retaining ring 30 and air bag 22 are moved in the direction 32 until the hooks 190–196 and 232–238 are disposed forward (to the left as viewed in FIG. 3) of the upper and lower locking ribs 70 and 90.

While the retaining ring 30 and the air bag 22 are being moved through the deployment opening 150, the retaining ring 30 is still in the collapsed condition. In the collapsed condition, the height (as measured in a direction from top to bottom as viewed in FIGS. 2–5) of the retaining ring 30 and of the pouch portion 260 of the air bag 22 is less than a predetermined dimension, i.e., the distance between the inner wall 76 of the upper locking rib 70 and the inner wall 96 of the lower locking rib 90. Thus, the retaining ring 30 is small enough to move through the passage defined between the upper locking rib 70 and the lower locking rib 90.

The retaining ring 30 is then moved from the collapsed condition shown in FIG. 3 to the expanded condition shown in FIG. 4. This expanding movement is effected by moving the assembly tabs 210, 212, 252 and 254 in the direction indicated by the double arrows 310 by relative movement of the grippers 302 and 304 on the assembly fixture 300. The assembly tabs 210 and 212 are moved in a direction toward the upper wall 50 of the housing 12. The assembly tabs 252 and 254 are moved in an opposite direction, toward the lower wall 60 of the housing 12. The upper and lower retaining ring members 152 and 154 as a result move apart from each other until the rivets 156–160 reach the outward limit of sliding travel of the upper retaining ring member relative to the lower retaining ring member. As this relative movement of the upper retaining ring member 152 and the lower retaining ring member 154 occurs, the inflation fluid opening in the air bag 22 increases in size (i.e., area).

When the retaining ring 30 is in the expanded condition illustrated in FIG. 4, the hooks 190–196 on the upper retaining ring member 152 are aligned with the slots 80–86 in the upper locking rib 70. The hooks 190–196 are spaced apart from the slots 80–86 in a direction parallel to the plane of the upper wall 50 of the central portion 14 of the housing 12. The hooks 232–238 on the lower retaining ring member 154 are aligned with the slots 100–106 in the lower locking rib 90. The hooks 232–238 are spaced apart from the slots 100–106 in a direction parallel to the plane of the lower wall 60 of the central portion 14 of the housing 12.

After the retaining ring 30 is moved to the expanded condition, the assembled retaining ring and air bag 22 are moved in the rearward direction 34 to interlock the retaining ring 30 with the housing 12. This rearward movement is effected by gripping and moving the assembly tabs 210, 212, 252 and 254 with the grippers 302 and 304 of the assembly fixture 300. The rearward movement of the assembly tabs 210, 212, 252 and 254 results in rearward movement of the other portions of the retaining ring 30, and of the air bag 22, in the direction 34 toward the deployment opening 150. The retaining ring 30 is maintained in the expanded condition illustrated in FIGS. 4 and 5 as this rearward movement occurs.

As a result of the rearward movement of the retaining ring 30, the hooks 190–196 on the upper retaining ring member 154 move into engagement with the upper locking rib 70. The second legs 200 of the hooks 190–196 move into and through the slots 80–86 in the front wall 72 of the upper locking rib 70. The darts 202 on the hooks 190–196 are forced down into the plane of the second legs 200 of the hooks as the darts pass through the openings 80–86. When the retaining ring 30 moves far enough rearward so that the darts 202 are disposed rearward of the front wall 72 of the upper locking rib 70, that is, within the channel 78 of the upper locking rib, the darts spring outward from the plane of the second legs 200 of the hooks 190–196.

Forward movement of the upper retaining ring member 152 relative to the upper locking rib 70 is then blocked by engagement of the darts 202 with the front wall 72 of the upper locking rib. Rearward movement of the upper retaining ring member 152 relative to the upper locking rib 70 is blocked by engagement of the first legs 198 of the hooks 190–196 with the front wall 72 of the upper locking rib. The upper retaining ring member 152 is thereby interlocked with the upper locking rib 70.

At the same time as the hooks 190–196 are moving into engagement with the upper locking rib 70 of the housing 12, the hooks 232–238 on the lower retaining ring member 154 move into engagement with the lower locking rib 90 of the housing. The second legs 242 on the hooks 232–238 move into and through the slots 100–106 in the front wall 92 of the lower locking rib 90. The darts 244 on the hooks 232–238 move inward into the plane of the second legs 242 of the hooks and then spring outward when the darts are disposed rearward of the front wall 92 of the lower locking rib 90.

Engagement of the darts 244 with the front wall 92 of the lower locking rib 90 blocks forward movement of the lower retaining ring member 154 relative to the lower locking rib. Engagement of the first legs 240 of the hooks 232–238 with the front wall 92 of the lower locking rib 90 blocks rearward movement of the lower retaining ring member 154 relative to the lower locking rib 90. The lower retaining ring member 154 is thereby interlocked with the lower locking rib 90, and thus with the housing 12. As a result, the retaining ring 30 as a whole is interlocked with the housing 12. The pouch portion 260 of the air bag 22 is thus secured in position in the chamber 40 in the housing 12.

The inflator 20 is assembled with the housing 12 by moving the inflator axially through the opening 112 in the first end portion 16 of the housing into the chamber 40. Lead wires and orientation studs (not shown) of the inflator 20 project from the openings 132 in the second end portion 18 of the housing 12. The inflator 20 is secured to the housing 12 in any known manner. If space considerations permit, the inflator 20 can be assembled with the housing 12 prior to connecting the retaining ring 30 and the air bag 22 with the housing.

In the event of a vehicle collision, a collision sensor (not shown) of the vehicle causes an electric current to flow through lead wires of the inflator 20 to actuate the inflator. The inflator 20 directs inflation fluid into the chamber 40 in the housing 12. The inflation fluid flows from the chamber 40 through the inflation fluid opening 270 into the inflation fluid volume in the main body portion 272 of the air bag 22. The air bag 22 moves from the folded and stored condition to an unfolded and inflated condition (not shown) to restrain a vehicle occupant. The interlocking engagement of the retaining ring 30 with the housing 12 retains the pouch portion 260 of the air bag 22 in the housing.

From the above description of the invention, those skilled in the art will perceive improvements, changes and modifications in the invention. For example, the housing with which the retaining ring interlocks could comprise portions of the vehicle instrument panel rather than be formed as a separate element. Also, the assembly tabs could be gripped manually rather than with a fixture, and the assembly tabs could have a different configuration than shown. Such improvements, changes and modifications within the skill of the art are intended to be covered by the appended claims.

Having described the invention, we claim:

1. An apparatus comprising:

an inflatable vehicle occupant restraint;

a housing in which said inflatable restraint is mounted, said housing having a deployment opening through which said restraint is inflatable to restrain a vehicle occupant;

a retaining ring for securing said inflatable restraint in said housing, said retaining ring comprising at least two members which are connected with each other and which are movable relative to each other, each of said two members having at least one grippable projecting assembly tab;

said inflatable restraint including a pouch portion which encircles said retaining ring and in which said retaining ring is located, said pouch portion having openings through which said grippable projecting assembly tabs extend, said pouch portion defining an inflation fluid opening of said inflatable restraint through which inflation fluid is directed into said restraint, the size of said inflation fluid opening being controlled by the relative position of said two members;

said retaining ring having a collapsed condition in which said two members are located in a first position relative to each other to define an inflation fluid opening of relatively small area, for insertion of said retaining ring and said pouch portion in a first direction through said deployment opening into said housing;

said retaining ring having an expanded condition in which said two members are located in a second position relative to each other to define an inflation fluid opening of relatively large area, said two members being movable to said second position by gripping and moving said grippable projecting assembly tabs; and means for securing said retaining ring to said housing with said retaining ring in the expanded condition.

2. An apparatus as set forth in claim 1 wherein said inflatable restraint defines an inflation fluid volume into which inflation fluid is directed through said inflation fluid opening, said assembly tabs being disposed outside of said inflation fluid volume.

3. An apparatus as set forth in claim 1 wherein said retaining ring includes first and second assembly tabs on a first one of said members and first and second assembly tabs on a second one of said members, said first assembly tab on said first member being movable in a direction away from said first assembly tab on said second member and said second assembly tab on said first member being movable in a direction away from said second assembly tab on said second member to move said retaining ring from the collapsed condition to the expanded condition.

4. An apparatus as set forth in claim 1 wherein said retaining ring is made of sheet metal including a series of interconnected walls extending transverse to said first direction, said assembly tabs being formed as one piece with said walls.

5. An apparatus as set forth in claim 1 wherein said means for securing said retaining ring to said housing comprises:

a plurality of hooks disposed on said retaining ring and projecting from said retaining ring in a direction generally parallel to said first direction, and wall portions of said housing extending transverse to said first direction and defining a plurality of hook openings in said housing for receiving said hooks, said hooks being movable into said hook openings on movement of said retaining ring in a second direction opposite to said first direction to interlock said retaining ring with said housing.

6. An apparatus as set forth in claim 5 wherein said assembly tabs and said hooks on said retaining ring extend in a direction toward said deployment opening when said hooks are disposed in said hook openings.

7. An apparatus comprising:

an inflatable vehicle occupant restraint;

a housing in which said inflatable restraint is mounted, said housing having a deployment opening through which said inflatable restraint is inflated to restrain a vehicle occupant;

a retaining ring for securing said vehicle occupant restraint in said housing, said retaining ring being insertable in a first direction through said deployment opening into said housing, said retaining ring including projections for location in openings in wall portions of said housing which extend transverse to said first direction;

said inflatable restraint having a pouch portion which encircles said retaining ring and in which said retaining ring is located, said pouch portion having a series of first openings through which said projections extend, said retaining ring and said pouch portion defining an inflation fluid opening through which inflation fluid is directed into said inflatable restraint;

said retaining ring being insertable in a first direction through said deployment opening into said housing and being movable in said housing in a second direction opposite to said first direction to locate said projections in said openings in said wall portions of said housing to secure said retaining ring and said inflatable restraint to said housing;

said retaining ring comprising at least two members which are connected with each other and which are movable relative to each other, the size of said inflation fluid opening being controlled by the position of said two members relative to each other;

said retaining ring having a collapsed condition in which said two members are located in a first position relative to each other to define an inflation fluid opening of relatively small area, for insertion of said retaining ring and said pouch portion through said deployment opening into said housing;

said retaining ring having an expanded condition in which said two members are located in a second position relative to each other to define an inflation fluid opening of relatively large area.

8. An apparatus as set forth in claim 7 wherein said retaining ring has a generally rectangular configuration, each one of said members having a generally U-shaped configuration including a base portion and spaced parallel leg portions, said leg portions of one of said members engaging said leg portions of the other one of said members, said base portions of said members extending generally parallel to each other, said projections being disposed on said base portions of said members and projecting in said second direction when located in said first openings.

9. An apparatus as set forth in claim 7 wherein said retaining ring comprises a plurality of grippable projecting assembly tabs, said pouch portion having a plurality of second openings through which said grippable projecting assembly tabs extend, said assembly tabs and said projections on said retaining ring extending in a direction toward said deployment opening when said projections are disposed in said first openings.

10. An apparatus as set forth in claim 9 wherein said retaining ring is made of sheet metal including a series of interconnected walls extending transverse to said first direction, said assembly tabs being formed as one piece with said walls, a first pair of said assembly tabs being movable in a direction away from each other to move said retaining ring from the collapsed condition to the expanded condition, a second pair of said assembly tabs being movable in a direction away from each other to move said retaining ring from the collapsed condition to the expanded condition.

11. An apparatus as set forth in claim 10 wherein said inflatable vehicle occupant restraint comprises at least one fabric panel defining an inflation fluid volume, said inflation fluid opening communicating with said inflation fluid volume, said assembly tabs and said projections being disposed outside of said inflation fluid volume.

12. A method of assembling a vehicle occupant restraint apparatus, comprising the steps of:

providing a housing with walls defining a chamber and a passage of a predetermined dimension into the chamber;

providing a retaining ring having a series of projecting fasteners and being movable between a collapsed condition in which a first dimension of the retaining ring is less than the predetermined dimension and an expanded condition in which the first dimension of the retaining ring is greater than the predetermined dimension;

providing an inflatable vehicle occupant restraint having a series of first fastener openings;

connecting the inflatable vehicle occupant restraint with the retaining ring by extending the fasteners on the retaining ring through the first fastener openings in the inflatable vehicle occupant restraint;

moving the retaining ring while in the collapsed condition in a first direction through the passage in the housing into the chamber in the housing;

moving the retaining ring while inside the chamber from the collapsed condition to the expanded condition; and interlocking the retaining ring with the walls of the housing by moving the retaining ring in a second direction opposite to the first direction;

wherein said step of providing a housing includes the step of providing a housing with walls which extend transverse to the first direction and which have a series of second fastener openings, said step of interlocking the retaining ring with the walls of the housing including the step of moving the fasteners on the retaining ring in the second direction into the second fastener openings on the housing walls.

13. A method as set forth in claim 12 wherein said step of providing a retaining ring includes the step of providing a retaining ring comprising at least two members which are connected with each other and which are movable relative to each other, each of the two members having at least one grippable projecting assembly tab, and said step of adjusting the retaining ring includes the step of moving the two members relative to each other to control the size of the inflation fluid opening.

14. A method as set forth in claim 13 wherein said step of adjusting the retaining ring includes the step of moving the two members relative to each other in a third direction which is transverse to the first and second directions.

15. A method of assembling a vehicle occupant restraint, comprising the steps of:

providing a housing with walls defining a chamber and a passage of a predetermined dimension into the chamber;

providing a retaining ring which is movable between a collapsed condition in which a first dimension of the retaining ring is less than the predetermined dimension and an expanded condition in which the first dimension of the retaining ring is greater than the predetermined dimension, the retaining ring having grippable projecting assembly tabs;

providing an inflatable vehicle occupant restraint having an inflation fluid opening and a series of assembly tab openings;

connecting the inflatable vehicle occupant restraint with the retaining ring, said connecting step including extending the assembly tabs on the retaining ring through the assembly tab openings in the inflatable restraint;

moving the retaining ring in the collapsed condition in a first direction through the passage in the housing into the chamber in the housing by gripping and moving the assembly tabs;

moving the retaining ring inside the chamber from the collapsed condition to the expanded condition by gripping and moving the assembly tabs; and interlocking the retaining ring with the walls of the housing by moving the retaining ring in a second direction opposite to the first direction by gripping and moving the assembly tabs.

16. A method as set forth in claim 15 wherein said step of connecting the inflatable restraint with the retaining ring includes the step of extending a series of fasteners on the retaining ring in the second direction through a series of first fastener openings in the inflatable restraint, and said step of interlocking the retaining ring with the walls of the housing includes the step of moving the fasteners on the retaining ring into a series of second fastener openings on the housing walls.

17. A method as set forth in claim 16 wherein said step of providing a retaining ring includes the step of providing a retaining ring comprising at least two members which are connected with each other and which are movable relative to each other, each of the two members having at least two of the assembly tabs, said step of adjusting the retaining ring including the step of moving the two members relative to each other in a third direction which is transverse to the first and second directions by gripping and moving the assembly tabs to control the size of the inflation fluid opening.

* * * * *